United States Patent [19]

Diekhans et al.

[11] Patent Number: 5,828,971
[45] Date of Patent: Oct. 27, 1998

[54] AUTOMATIC STEERING DEVICE FOR AN ELECTRICALLY CONTROLLABLE HYDRAULIC STEERING SYSTEM, ESPECIALLY FOR AN AGRICULTURAL VEHICLE

[75] Inventors: Norbert Diekhans, Guetersloh; Ludger Autermann, Drensteinfurt; Stefan Hagedorn, Warendorf; Jochen Huster, Harsewinkel, all of Germany

[73] Assignee: Claas KGaA, Harsewinkel, Germany

[21] Appl. No.: 612,531

[22] Filed: Mar. 8, 1996

[51] Int. Cl.⁶ .............................. A01B 69/00; G06F 17/00
[52] U.S. Cl. ........................ 701/41; 701/42; 701/44; 701/50; 180/422; 180/445; 56/10.2 F
[58] Field of Search ................. 364/424.07, 424.051, 364/424.052, 424.053, 424.054; 180/401, 409, 422, 445; 56/10.2 F, 10.2 E; 71/50, 41, 42; 43, 44

[56] References Cited

U.S. PATENT DOCUMENTS

| | | | |
|---|---|---|---|
| 3,946,825 | 3/1976 | Gail | 180/401 |
| 3,991,618 | 11/1976 | Stampfer et al. | 73/865.9 |
| 4,197,690 | 4/1980 | Eistert et al. | 56/10.2 F |
| 4,304,316 | 12/1981 | Lang | 180/401 |
| 5,010,719 | 4/1991 | Korthuis | 56/10.2 F |
| 5,019,983 | 5/1991 | Schutten et al. | 364/424.07 |
| 5,414,625 | 5/1995 | Hattori | 701/27 |
| 5,485,892 | 1/1996 | Fujita | 180/167 |
| 5,509,486 | 4/1996 | Anderson | 56/10.2 E |
| 5,606,504 | 2/1997 | Anderson | 364/424.07 |

FOREIGN PATENT DOCUMENTS

| | | |
|---|---|---|
| 2 500 988 | 10/1984 | France . |
| A-2109744 | 9/1972 | Germany . |
| 36 27 015 | 2/1988 | Germany . |
| 40 04 247 A1 | 8/1991 | Germany . |
| 44 20 422 A1 | 12/1995 | Germany . |

OTHER PUBLICATIONS

JP 61–13311 Nihon Yusouki K.K. and Minoru Okada, Patents Abstracts of Japan Jan. 1986.

Primary Examiner—Tan Q. Nguyen
Attorney, Agent, or Firm—Michael J. Striker

[57] ABSTRACT

The automatic steering device for an electrically controllable hydraulic steering system automatically controls steered wheels (HR) of a steered vehicle, especially an agricultural machine, according to at least one electronic steering control signal (SHL,SHR). The automatic steering device includes one or more locating devices (OV) producing one or more locating signals (OS), a regulating device (ST) which periodically digitizes the locating signal or signals (OS), and produces the at least one electronic steering control signal by a logic combination of the digitized locating signal or signals and a predetermined locating criterion, particularly a lateral displacement of the vehicle from an edge of an agricultural material, to minimize a deviation of the locating signal or signals determined according to the predetermined criterion so that the at least one electronic steering control signal (SHL,SHR) increases in an approximately proportional manner in the vicinity of a null deviation from the predetermined locating criterion but increases progressively beyond the vicinity of the null deviation. A fuzzification of the control criteria and a defuzzification of at least one intermediate parameter to form the at least one electronic steering control signal (SHL,SHR) are disclosed.

32 Claims, 5 Drawing Sheets

AUTOMATIC STEERING DEVICE FOR AN ELECTRICALLY CONTROLLABLE HYDRAULIC STEERING SYSTEM, ESPECIALLY FOR AN AGRICULTURAL VEHICLE

BACKGROUND OF THE INVENTION

The present invention relates to an automatic steering device for a steered vehicle, especially for an agricultural machine having an electronically controlled hydraulic steering mechanism.

An automatic steering device, especially for an agricultural machine, is known having at least one locating device, especially a harvest material edge locating device or row locating device, whose locating signal or signals are input to a regulating device which provides at least one electrical steering control signal to an electronically controlled hydraulic steering device for the steered wheels of the agricultural machine so that locating signal deviations from a predetermined locating criterion, particularly a lateral distance of an agricultural machine from an edge of the harvestable material, are minimized.

A steering device of this type is described in German Published Patent Application DE-A-21 09 744. In this device locating signals are directly input to means for controlling the steering hydraulics so that a predetermined steering criterion can be maintained only in a very coarse way.

SUMMARY OF THE INVENTION

It is an object of the invention to provide an automatic steering device, particularly for an agricultural machine, which provides a considerably better steering accuracy, even when operation changes of the vehicle considerably influence the steering.

These objects and others which will be made more apparent hereinafter are attained in an automatic steering device for an electrically controllable hydraulic steering system of a steered vehicle, advantageously an agricultural machine, having steered wheels. The hydraulic steering system includes means for controlling the steered wheels according to at least one electronic steering control signal.

According to the invention the automatic steering device comprises at least one locating device including means for generating at least one locating signal and a regulating device including means for receiving the at least one locating signal, means for periodically digitizing the at least one locating signal to form an at least one digitized locating signal, means for producing the at least one electronic steering control signal by a logic combination of the at least one digitized locating signal and a predetermined locating criterion for a minimization of a deviation of the at least one locating signal determined according to the predetermined criterion. The at least one electronic steering control signal produced by the regulating device increases in an approximately proportional manner in the vicinity of a null deviation from the predetermined locating criterion but increases progressively beyond the vicinity of the null deviation. This means that the at least one electronic control signal increases linearly with increasing deviation in a region close to the null deviation but increases progressively faster than the aforementioned linear increase when the deviation is beyond the vicinity of the null deviation.

The control characteristics are advantageously improved by input of additional input signals into the regulating device. Input signals which are significant for safety are received by the regulating device so that the electronic regulation or control device and the automatic regulation is deactivated when it is either shut off by an operator or is shut off because of a signalled defect condition. A direct control of the hydraulic steering system by the steering wheel occurs in this safety-controlled state.

For simplification of the adjustment to different steering conditions, which can concern a change of the vehicle or its use in different environmental conditions, it has proven advantageous that the regulating device is controlled by a fuzzy control device and associated fuzzy parameters and the steering control variable is transformed by a defuzzification controller and appropriate parameters to the at least one steering control signal. Because of that it is comparatively easy to provide initial quantitative steering control from qualitative prerequisites in a predetermined way.

The fuzzy control device and parameters and similarly the defuzzification control device and parameters are input by an input device either directly into the regulating device or are initially processed by a central processor, which communicates with the regulating device. Also they can be input into an electronically programmable memory, e.g. an EPROM or an EEPROM.

The different input signals are advantageously digitized and standardized in the regulating device according their null point position and their range size. Some extreme input signals are produced by suitable deviations and a learning process for the standardizing parameter or variable is thereby initiated by the input device. Similarly the center position for the different sensors is determined after their adjustment as the null point position and is learned by the regulating device.

In a corresponding way the defuzzification parameter for the steering system is provided accordingly by a learning process. It has proven particularly advantageous to standardize the left steering control signal and the right steering control signal of the regulating device in the vicinity of their associated null point values differently, whereby a delayed response of the valves is largely eliminated in its action if necessary and a largely proportional transmission of the steering control information to the steering control parameter produced by the defuzzification.

In practice it has proven particularly advantageous in operation of a harvesting machine to standardize the steering control parameter to upper and lower limiting values so that the steering system does not automatically control the largest allowed steering angles.

It has proven especially advantageous to perform a statistical analysis of the steering control parameters in the regulating device and to estimate the accuracy of the steering on the basis of the statistical parameter and, depending on that, to perform a stepwise variation of the fuzzification parameters, so that an optimization of the steering occurs in a successive manner.

The amplitude scatter, the amplitude peak values and the peak values of the regulation time constant have proven particularly suitable as statistical variables for the foregoing statistical analysis for evaluation of the steering. It has proven particularly advantageous to perform a correlation of the input signal to the vehicle speed so that the steering occurs in regard to the predetermined travel path, the deviation remains in the maintained set range and is largely independent of vehicle speed.

For monitoring the regulating device because of safety considerations a periodic signal of an operating function is fed to an external device which rectifies the periodic signal and inputs it into a safety relay switch, whose safety relay switch contacts connected in series with additional switch contacts are connected to the right and left electrically controlled steering control values to supply current to them so that these spring-loaded valves, when they are not supplied with the current, are shifted into the safe closed state.

In a preferred embodiment the digital control is easily obtained with a commercial 8-Bit microprocessor. The input and output data and also the parameter produced by the self-optimization are stored in a suitable storage device or output for a later use under similar operating conditions.

The regulating device can process locating signal from different types of locating devices into their standardized form. It has proven particularly advantageous for a harvesting machine, to provide three locating device components including a first locating device component directed at a portion of a field on which agricultural material is not present, e.g. a stubble field, but adjacent an edge of an agricultural material in the field, a second locating device component directed at a portion of the material adjacent an edge of the material but not including the edge, and a third locating device component directed at a portion the edge of the material. The first and second regulating signals from the first and second locating device components define a preset range parameter, an average value of the first locating signal and said second locating signal provides a null point value for the third locating signal and a standardized locating signal used in further processing to obtain the steering control signal is obtained from the third locating signal by standardizing with the preset range parameter. The locating device components may include means to produce either optical, especially infrared, and acoustic signals.

The locating device, which detects the grain edge, is advantageously equipped so that it detects a region, which is several meters in front of the cutting or harvesting mechanism, since the harvesting machine is steering at its rear wheels and thus a deviation from the provided path of travel can be compensated for only by a comparatively larger correction.

In this embodiment it has proven particularly advantageous to input the actual value signal indicative of the wheel angular position as an input variable into the regulating device so that the later path of the harvesting machine is taken into consideration based on this signal. It has proven particular advantageous to set up a two-dimensional characteristic field whose input variables are locating signals and wheel angular position signals and whose contents form the adjusted steering control parameters. This characteristic field is gradually varied in its input values to provide an optimum steering.

Electromechanical row sensors which are known and used in corn harvesting machines, may also be used to produce locating signals analyzed in the regulating device.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
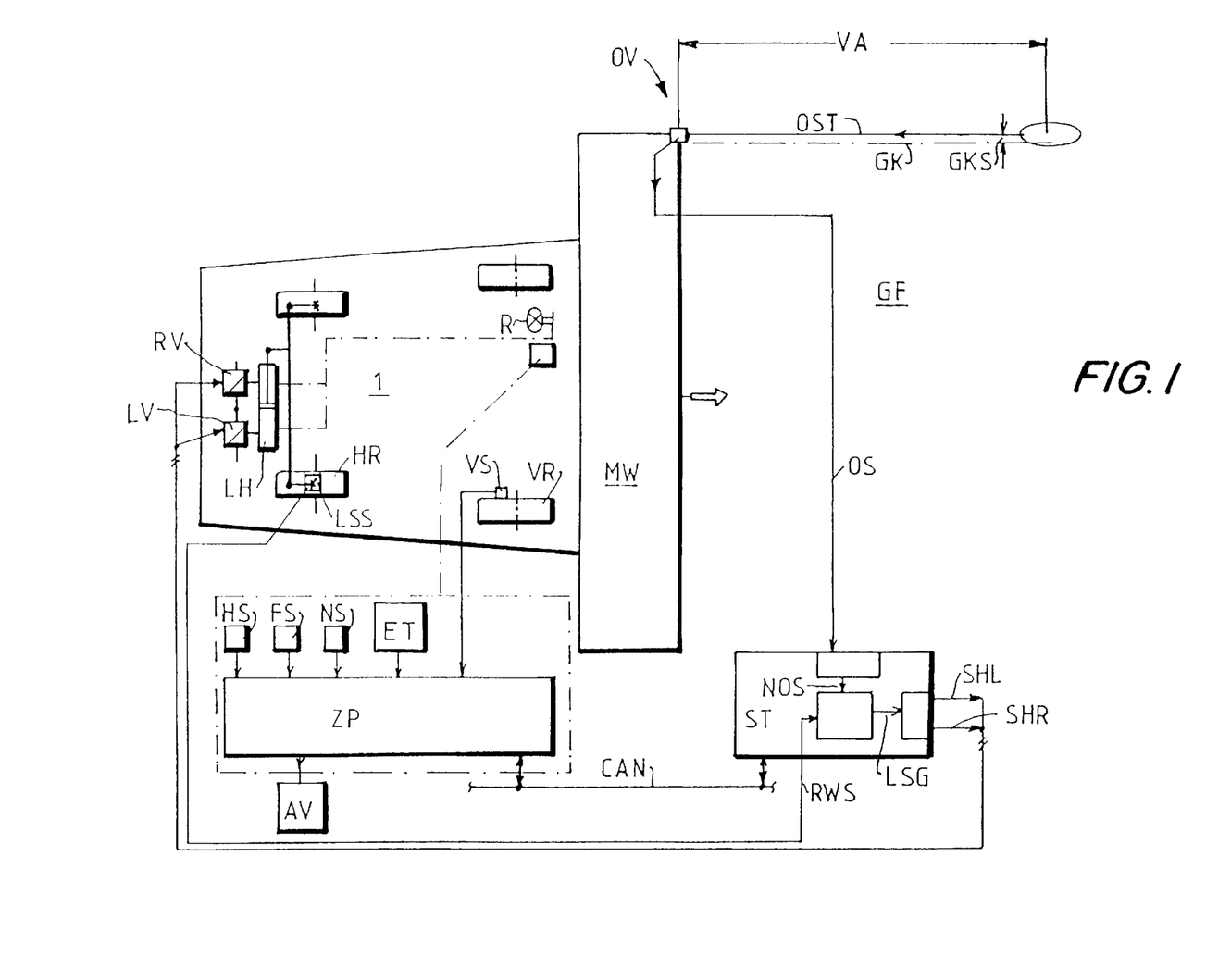
FIG. 1 is a diagrammatic top view of a harvesting machine with a fuzzy steering device according to the invention.

FIG. 1 shows a harvesting machine 1 with a harvesting mechanism MW which travels automatically along a grain edge GK of a grainfield GF with as small a deviation as possible from a predetermined lateral distance GKS from the grain edge GK. A locating device OV is positioned about 1.5 m above the harvesting mechanism MW, whose locating beam OST is directed on the grain edge GK, and whose locating signal OS is fed to a regulating device ST. In the embodiment shown in the drawing the regulating device ST is connected by a standard data bus CAN with a central processor ZP, by which the remaining control functions of the harvesting mechanism MW are monitored. An input device ET and an output device AV are provided for the central processor ZP. The central processor ZP receives a speed signal VS from the front wheels VR and a steering signal LRS from the steering wheel R. The hydraulic steering device LH is controlled by the regulating device ST by means of a left steering control valve LV and a right steering control valve RV whose hydraulic outputs act on the hydraulic steering device to steer the rear wheels HR. An angular position signal RWS is produced by the wheel steering mechanism and fed to the regulating device. The left and right steering control valves LV, RV are spring-loaded self-closing valves so that they automatically close in the event of a power failure. In this state the steering is performed directly by the known hydraulic steering mechanism from the steering wheel. Furthermore a hand switch HS, a foot switch FS and a safety switch NS are provided in the operator's cab, whose signals are input to the steering control valve arrangement for safety reasons and are also made available to the regulating device for similar reasons.

The forward distance VA at which the locating beam OST probes the grain edge GK corresponds approximately to the distance of the front wheels VR from the rear wheels HR as seen in FIG. 1. An angular inclination of the harvest mechanism axis to the grain edge GK, which produces partial components in the locating signal, results in equivalent components in the angular wheel position signal. The angular components in the locating signal are superimposed on components of lateral displacement of the alignment axis of the harvesting mechanism from the predetermined set value, i.e. the components, which maintain the grain edge lateral position GKS.

Figure 2:
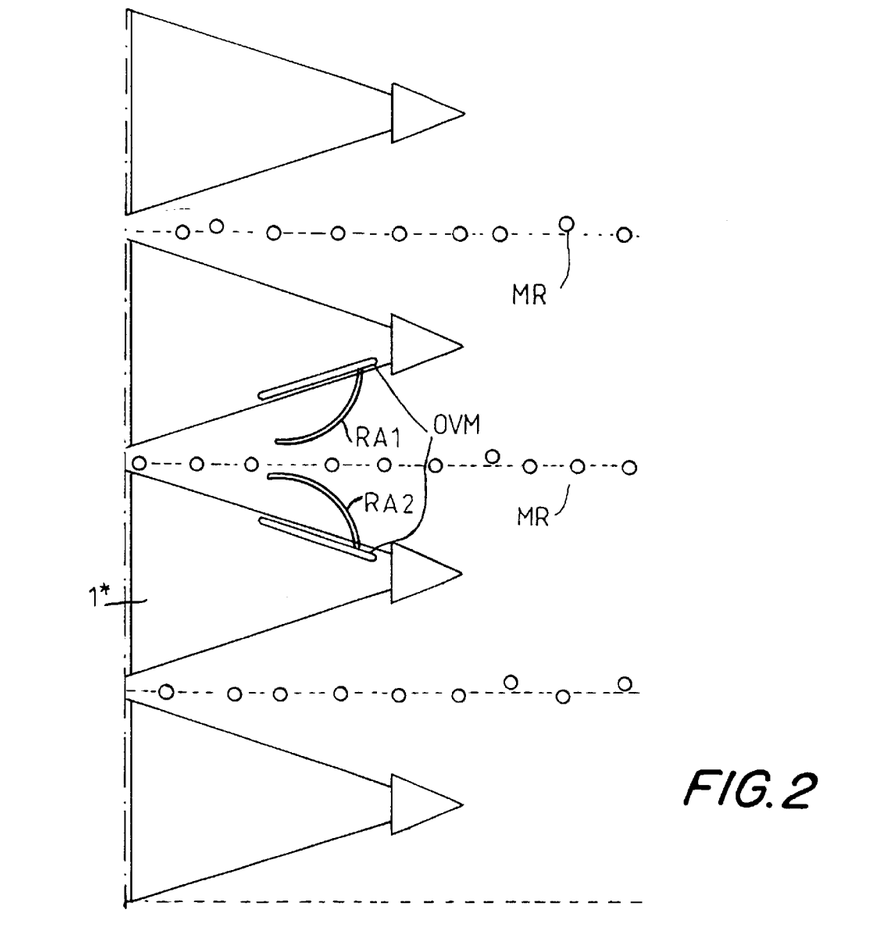
FIG. 2 is a diagrammatic partial view of a corn harvesting machine.

FIG. 2 shows an additional embodiment of a locating device on the harvesting mechanism of a corn harvesting machine 1*. In a known way sensing elements RA1, RA2 are arranged on the cutting mechanism support so that their ends make contact with a corn row MR and on unsymmetrical pivoting produce a locating signal for a right or left correction in the sensors OVM.

Figure 3:
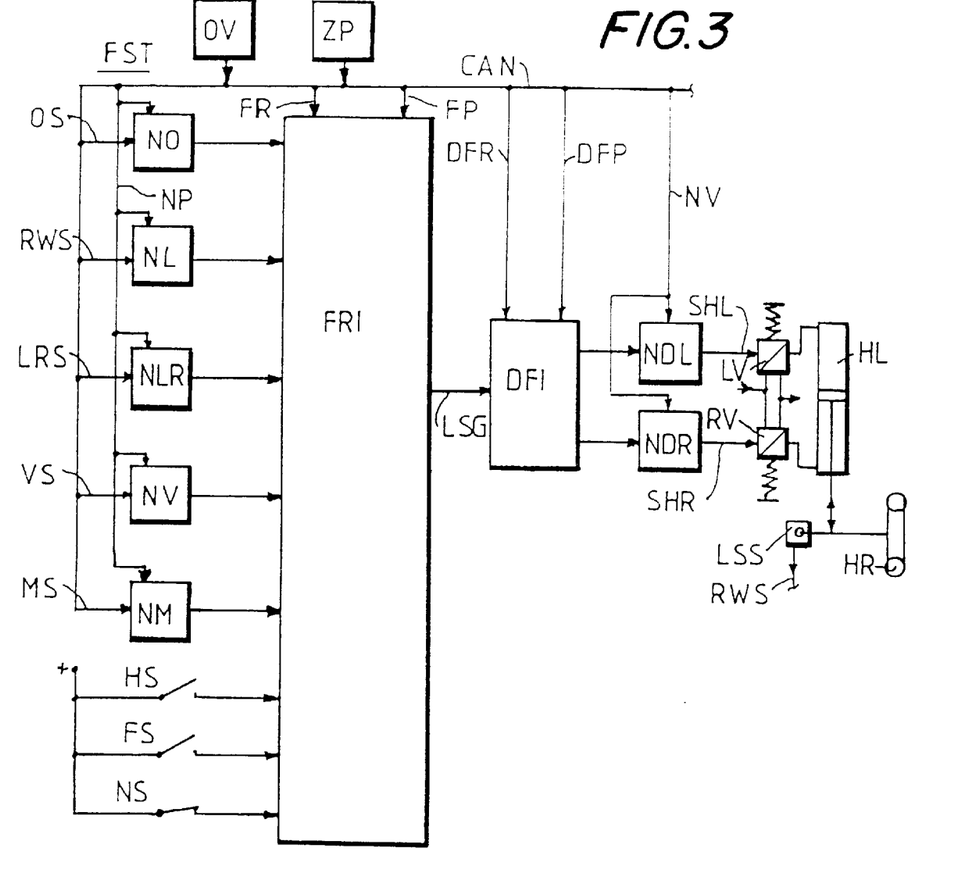
FIG. 3 is a block diagram of a fuzzy controller.

A schematic circuit diagram of the regulating device, which is particularly a fuzzy control device FST, is shown in FIG. 3. This fuzzy control device FST comprises a fuzzy regulating interpreter FRI, which produces the steering control parameter LSG from an input signal, which is converted in a defuzzification interpreter DFI into the individual steering control signals (SHL, SHR).

A locating signal OS is provided as an input parameter, which is converted by a standardizing parameter NP in a locating signal standardizing device NO, and the result is fed to the interpreter FRI. Also the angular wheel position signal RWS is fed via an associated standardizing device NL to the interpreter FRI. The fuzzy control variable FR and the associated fuzzy parameter FP are input by the input device ET via the data bus CAN into the interpreter FRI and stored there. The steering control variable LSG produced from the locating signal OS and the angular wheel position signal RWS is converted by the defuzzification control variable DFR and the associated defuzzification parameter DFP in the defuzzification interpreter DFI and the resulting steering control signals NDL, NDR are converted in the standardizing device into left-right control signals SHL, SHR. The hydraulic steering device LH acts on the rear wheels HF and is controlled electromagnetically by a left steering valve and a right steering valve with a magnet. The standardization parameter NV, the defuzzification control variable DFR and the defuzzification parameter DFP are input and stored in the processor ZP for example via the data bus CAN.

In a further development additional input signals, namely a steering angular position signal LRS via an associated standardizing device NLR, a speed signal VS via a standardizing device NV and a center position signal MS via a standardizing device NM are fed into the interpreter FRI. Switch signals of a hand switch HS, a foot switch FS and an emergency switch NS are also fed into the interpreter FRI.

The standardizing parameters NP for the standardizing of the input signals are received from the data bus CAN.

The locating device OV can directly input its locating signal OS into the standardizing device NO or, as shown, already digitized, its locating signal can be fed further over the data bus CAN. The other sensors which produce the input variables are distributed throughout the harvesting machine and input their signals via the associated digitzer and processor. Understandably the standardizing devices can be installed in the sensor devices themselves.

A wheel angular position sensor LSS, whose wheel angular position signal RWS is used as an input signal in a suitable manner, is mounted on the steerable rear wheels HR.

Figure 4:
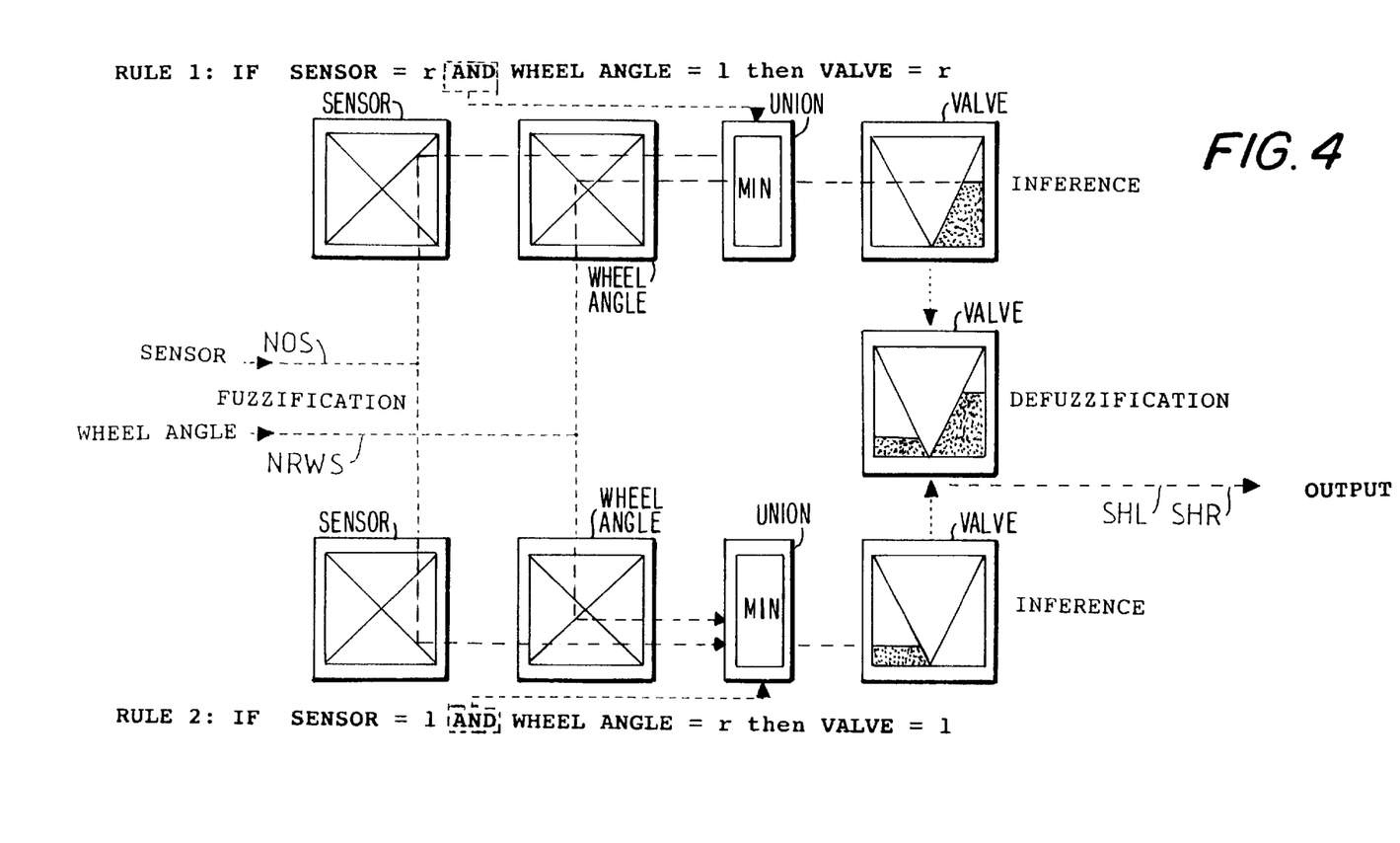
FIG. 4 is a diagrammatic representation of part of its operations.

FIG. 4 shows an example of the fuzzification of the standarized locating signal NOS and the standarized angular position signal NRWS over the associated data filed, whose output data are connected by a fuzzy combination MIN to an additional data field INFERENCE for the purpose of defuzzification, whereby the left and right hydraulic steering signals SHL, SHR are produced and read out.

Figure 5:
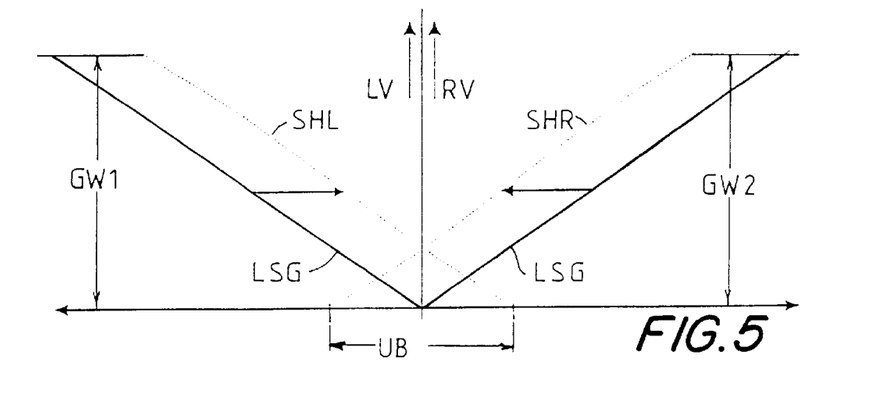
FIG. 5 is a graphical illustration of a standardizing function of the control signals.

FIG. 5 shows an example of the conversion of the steering control parameters in both standardizing devices, which has proven especially suitable. Here both control signals of the steering valves, the left steering signal SHL and the right steering signal SHR, cutting across an overlapping region UB around the null point are fed out so that the response threshold of the hydraulic control valves is considered.

Both control signals SHL, SHR are limited to a boundary value GW1, GW2 so that no extreme steering wheel deviations can occur. The size of the overlapping region UB and the boundary values GW1, GW2 can be established in practice and optimized.

Figure 6:
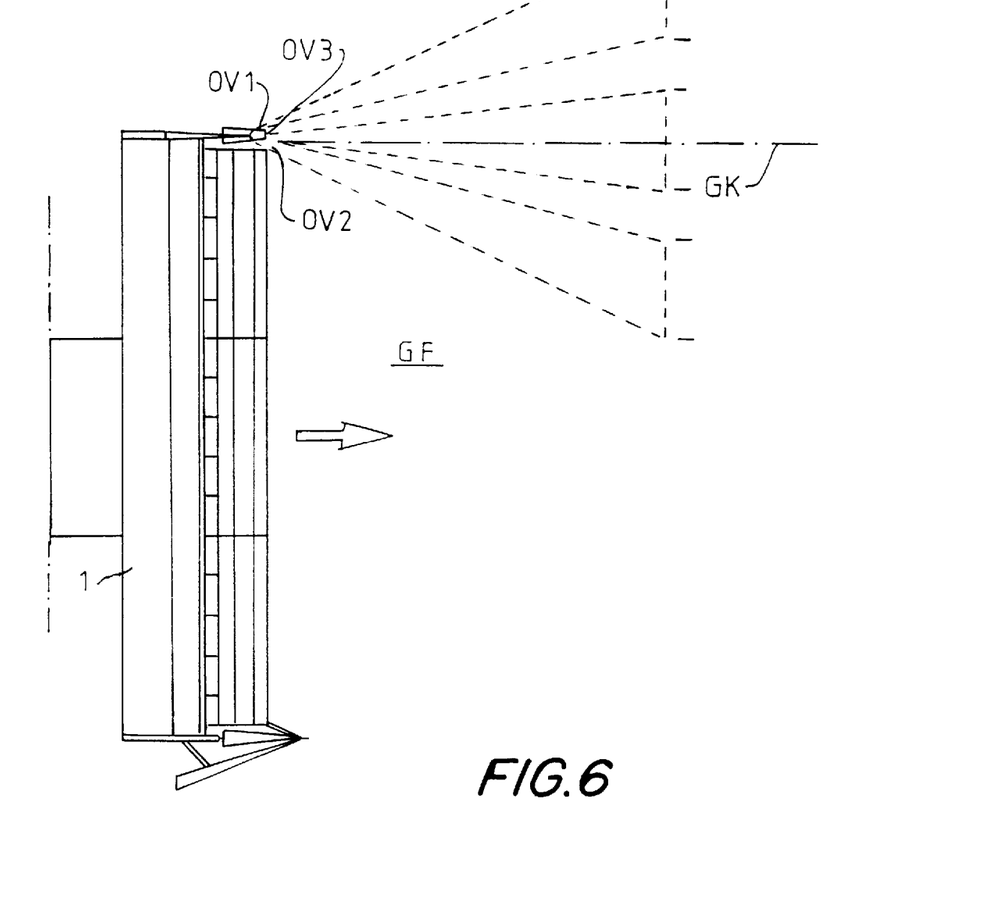
FIG. 6 is a top plan view of a locating device with a grain edge sensor.

FIG. 6 shows a locating device, which is preferably an ultrasonic or infrared locating device. A locating device comprising three locating device components OV1, OV2, OV3 is provided on the cutting mechanism near the grain edge GK of the harvesting machine 1, of which the first locating device component OV1 detects the already harvested stubble field, the second locating device component OV2 is observing or is directed at the grain field and the third locating device component OV3 is directed at and/or is observing the grain edge GK. The three locating device components may also be provided by a scanning strip sensor, particularly for optical locating methods. The scanning strip sensor has three sections on which the respective portions of the field observed by the locating device components are focussed by a suitable focussing system. Both signals of the outer locating portions or regions of the field are used as reference signal for upper and lower limits of the signal from the central locating portion of the field so that a uniform sensitivity is guaranteed despite fluctuating input signal differences.

Figure 7:
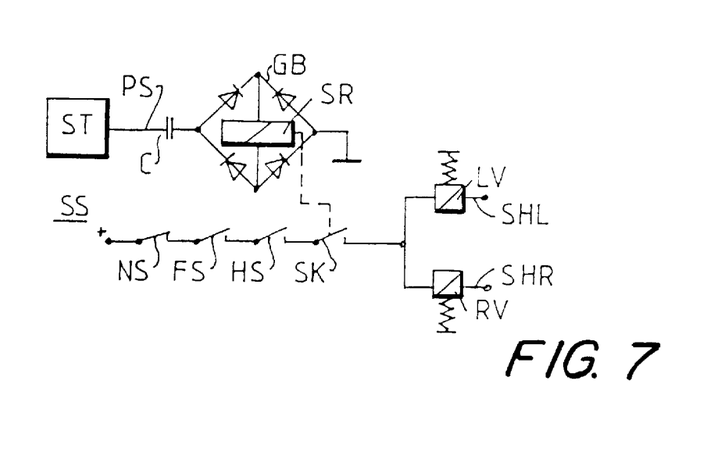
FIG. 7 is schematic diagram of a safety circuit.

FIG. 7 shows a safety circuit device SS. The supply for both electrically controlled steering valves LV, RV which are controlled with the steering control signals SHL, SHR is connected to them via an AND-circuit, i.e. a group of safety-relevant switch contacts connected in series with each other. A rest contact of an emergency switch NS, an operated contact of a foot switch FS, an operated contact of a hand switch HS and an operated contact of a safety relay switch SK,SR are connected in series with each other. The safety relay switch SK,SR is activated by a periodic operating signal PS from the regulating device ST, when it is fed to the rectifying bridge GB via a separating condenser C and thus rectified current acts on the coil SR of safety relay switch SK,SR. When the regulating device no longer operates periodically or when an automatic steering is no longer possible as determined by analysis of control criteria, the safety circuit device is no longer energized and thus the supplied flow to the hydraulic valves LV, RV is shut off, so that they are closed by the spring force. The structure of the regulating device ST, which produces the periodic operating signal and the switching threshold of the safety circuit device are such that during a failure of a component such as the condenser or one of the bridge rectifiers, the relay shuts off and thus the safety circuit device acts to shut down the automatic steering control.

It has been shown that about 60% of the attentiveness of the operator must be devoted to steering of the machine with conventional harvesting machines. The drivability of the machine is thus particularly difficult since the steering of the machine with the rear wheels requires a comparatively long course maintaining time period until a lateral deviation of the machine toward the grain edge occurs, and, after that, the correct course must again be taken by a suitable controlling correction. The automatic steering permits a generally more rapid travel and a nearly complete loading of the cutting mechanism width up to a safety residual spacing of 10 to 20 cm with an almost complete relief of the driver or operator.

The structure of the regulating device allows the complete integration of the steering system in the remaining digital control of the harvesting machine by means of a digital computer. The required control variables and parameters are fed to the processor by a simple parameterization and by operation of the central operator's console of the harvesting machine; the regulating device itself is completely neutral in its basic structure. Also the most widely diverse locating systems may be connected by a simple parameterization and standardization of the locating signals; no special hardware design is required for the regulating device. By the use of fuzzy logic additional information present may be easily brought into the control processor in as much as it appears to be useful for an additional optimization of the control process. This additional information has increased relevance because of the automatic optimization While the invention has been illustrated and described as embodied in an automatic steering apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

We claim:

1. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a predetermined locating criterion to minimize a deviation of said at least one locating signal (OS) determined according to said predetermined locating criterion so that said at least one electronic steering control signal (SHL,SHR) increases in an approximately proportional manner in the vicinity of a null deviation from said predetermined locating criterion but increases progressively beyond said vicinity of said null deviation.

2. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a predetermined locating criterion to minimize a deviation of said at least one locating signal (OS) determined according to said predetermined locating criterion, wherein the regulating device (ST) comprises a fuzzy control device (FST) including a fuzzy regulating interpreter (FRI), said fuzzy regulating interpreter (FRI) including means for transforming said at least one locating signal (OS) into a steering control parameter (LSG) according to a fuzzy parameter (FP), and a defuzzification interpreter (DFI) including means for transforming said steering control parameter into said at least one steering control signals (SHL, SHR) according to a defuzzification parameter (DFP).

3. The automatic steering device as defined in claim 2, wherein said regulating device (ST) includes means for receiving at least one input signal selected from the group consisting of a wheel angular position signal (RWS) of said steered wheels (HR), a speed signal (VS) of a speed sensor, a steering signal (LRS) of a steering wheel (R), a center position signal (MS), a hand switch signal of a hand switch (HS), a foot switch signal of a foot switch (FS) and an emergency switch signal of an emergency switch (NS) individually or together into a characteristic data field; means for addressing said characteristic data field periodically and means for transforming characteristic data in said characteristic data field into said at least one electronic steering control signal (SHL,SHR).

4. The automatic steering device as defined in claim 3, wherein said characteristic data field is two-dimensional.

5. The automatic steering device as defined in claim 2, wherein said regulating device (ST) includes means for producing said steering control parameter (LSG) from only said steering signal (LRS) and not said at least one locating signal (OS) if at least one of a shut down condition and emergency condition is signaled by means of at least one of said switch signals of said hand switch (HS), of said foot switch (FS) and of said emergency switch (NS).

6. The automatic steering device as defined in claim 4, wherein the fuzzy regulating interpreter (FRI) includes means for storing the fuzzy parameter (FP) for controlling operation of said fuzzy regulating interpreter, and further comprising an input device (ET) connected to the regulating device (ST) for supplying the fuzzy parameter (FP) to the means for storing the fuzzy parameter; and the defuzzification interpreter (DFI) includes means for storing the defuzzification parameter (DFP) for controlling operation of said defuzzification interpreter (DFI) and the input device (ET) also provides means for inputting the defuzzification parameter (DFP) to the means for storing the defuzzification parameter.

7. The automatic steering device as defined in claim 6, wherein said means for storing comprise an electronically programmable storage device.

8. The automatic steering device as defined in claim 7, wherein said electronically programmable storage device comprises an EPROM or an EEPROM.

9. The automatic steering device as defined in claim 2, wherein said regulating device (ST) has intermediate means for storing said at least one input signal (OS, LRS, RWS) received periodically by said regulating device for a predetermined time interval and means for producing a contribution to said steering control parameter (LSG) from said at least one input signal.

10. The automatic steering device as defined in claim 2, wherein said regulating device (ST) has means for converting and for standardizing said at least one input signal (OS, LRS, RWS) according to a null point position and a range size parameter of said at least one input signal, in which a standardizing parameter (NP) is fed to said regulating device (ST) by an input device (ET) and said regulating device (ST) operates automatically when a predetermined variation from said locating criterion occurs.

11. The automatic steering device as defined in claim 4, wherein said at least one electronic steering control signal (SHL,SHR) consists of a left steering control signal (SHL) and a right steering control signal (SHR) and said means for controlling said steered wheels includes a left steering control valve (LV) and a right steering control valve (RV) and means for controlling said left steering control valve (LV) according to said left steering control signal (SHL) and means for controlling said right steering control valve (RV) according to said right steering control signal (SHR).

12. The automatic steering device as defined in claim 11, wherein the regulating device (ST) includes means for standardizing said left steering control signal (SHL) and said right steering control signal (SHR) differently in the vicinity of null points of said left and right steering control signals in an overlapping region (UB).

13. The automatic steering device as defined in claim 11, wherein the regulating device (ST) includes means for standardizing said left steering control signal (SHL) and said right steering control signal (SHR) to predetermined limiting values (GW1,GW2) when the at least one locating signal (OS) contributes to said steering control parameter (LSG), wherein said predetermined limiting values (GW1,GW2) are below positioning signals corresponding to respective maximum possible steering angles.

14. The automatic steering device as defined in claim 11, wherein the regulating device (ST) is connected to an input device (ET) for supplying at least one standardizing parameter.

15. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a Predetermined locating criterion to minimize a deviation of said at least one locating signal (OS) determined according to said predetermined locating criterion wherein said regulating device (ST) includes means for generating a steering control parameter (LSG), means for analyzing at least one of an amplitude and control times of the steering control parameter (LSG) statistically over a number of cycles to obtain at least one statistical parameter, means for varying stepwise at least one of a standardizing parameter and fuzzy parameter (NP,FP) according to said at least one statistical parameter and means for varying stepwise said at least one of said standardizing parameter and said fuzzy parameter (NP,FP) according to a change in said at least one statistical parameter from a previously value of said at least one statistical parameter to reduce subsequent values of said at least statistical parameter.

16. The automatic steering device as defined in claim 15, wherein said at least one statistical parameter comprises at least one of amplitude dispersion factors, amplitude peak values and control time constant-peak values.

17. The automatic steering device as defined in claim 15, wherein the means for analyzing at least one of said amplitude and control times of the steering control parameter (LSG) statistically periodically analyzes said amplitude to obtain amplitude peak values over a vehicle travel path by means of a speed signal (VS) and said at least one statistical parameter to be reduced is said amplitude peak values relative to said vehicle travel path.

18. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a predetermined locating criterion to minimize a deviation of said at least one locating signal (OS) determined according to said predetermined locating criterion wherein said electrically controllable hydraulic steering system includes a hydraulic steering device (LH) directly controllable by the steering wheel (R) via right and left hydraulic control connections; electrically powered left steering control valve (LV) and electrically powdered right steering control valve (RV) connected hydraulically to said hydraulic steering device (LH) and safety circuit means (SS) for supplying electrical power to said left and right steering control valves (LV,RV) and thus activating said steering control valves, said steering control valves (LV,RV) being closed when said electrical power is not supplied thereto by said safety circuit means (SS).

19. The automatic steering device as defined in claim 18, wherein said safety circuit means (SS) comprises an AND-circuit including at least one of hand switch (HS), foot switch (FS), an emergency switch (NS) and a regulating device monitoring relay switch (SK,SR).

20. The automatic steering device as defined in claim 19, wherein the regulating device monitoring relay switch (SK, SR) comprises an operated contact (SK) and a relay coil (SR) and the regulating device (ST) includes means for producing a rectified filtered periodically varying status signal (PS), means for capacitively coupling said status signal (PS) to said relay switch (SK,SR) and means for activating said relay switch (SK,SR) when said status signal (PS) exceeds a predetermined threshold.

21. The automatic steering device as defined in claim 20, wherein said status signal (PS) is conducted via a rectifier bridge (GB) to said relay coil (SR) so that current is fed through said operated contact (SK) to said left and right steering control valves (LV,RV) when said relay coil is energized.

22. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a predetermined locating criterion to minimize a deviation of said at least one locating signal (OS) determined according to said predetermined locating criterion wherein the regulating device (ST) comprises an 8-bit microprocessor and a fuzzy control device (FST) including a fuzzy regulating interpreter (FRI), said fuzzy regulating interpreter (FRI) including means for transforming said at least one locating signal (OS) into a steering control parameter (LSG), and a defuzzification interpreter (DFI) including means for transforming said steering control parameter (LSG) into said at least one steering control signals (SHL, SHR) according to a defuzzification parameter (DFP) and further comprising at least one additional processor (ZP) and a CAN-bus connecting said at least one additional processor with said 8-bit microprocessor, wherein said at least one additional microprocessor includes a programmable input device (ET) for inputing a standardizing parameter (NP) of the regulating device (ST) into the regulating device and for inputing a fuzzy control variable (FR), a fuzzy parameter (FP), a defuzzification control variable (DFR) and a defuzzification parameter (DFP) into the regulating device for controlling operation of said fuzzy regulating interpreter and said defuzzification interpreter.

23. The automatic steering device as defined in claim 22, wherein the regulating device (ST) includes means for generating and processing a standardizing parameter (NP), said fuzzy control variable (FR), said defuzzification control variable (DFR) and statistical parameters obtained therefrom and means for transmitting said standardizing parameter (NP), said fuzzy control variable (FR), said defuzzification control variable (DFR) and said statistical parameters to said at least one additional processor (ZP), and said at least one additional processor (ZP) has means (AV) for displaying said fuzzy control variable (FR), said defuzzification control variable (DFR) and said statistical parameters.

24. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a predetermined locating criterion to minimize a deviation of said at least one locating signal (OS) determined according to said predetermined locating criterion
wherein said at least one locating device (OV) comprises three locating device components (OV1, OV2, OV3) including a first locating device component (OV1) directed at a portion of a field on which agricultural material is not present, but adjacent an edge (GK) of said agricultural material in said field and including means for producing a first locating signal (OS1), a second locating device component (OV2) directed at a portion of said material adjacent said edge of said material but not including said edge of said material and including means for producing a second locating signal (OS2), a third locating device component (OV3) directed at a portion of said material including said edge of said material and including means for producing a third locating signal (OS3) and means for transmitting said first, second and third regulating signals (OS1, OS2, OS3) from said locating device components and means for generating a standardized locating signal (NOS) comprising means for determining a preset range parameter as a difference between said first locating signal (OS1) and said second locating signal (OS2), means for determining an average value of said first locating signal (OS1) and said second locating signal (OS2) to obtain a null point value for said third locating signal (OS3) and means for deriving said standardized locating signal (NOS) from said third locating signal (OS3) and said null point value.

25. The automatic steering device as defined in claim 24, wherein said first, second and third locating device components (OV1, OV2, OV3) comprise an optical scanning strip sensor which observes signals from various solid angles.

26. The automatic steering device as defined in claim 24, wherein said first, second and third locating device components each comprise at least one infrared sensor.

27. The automatic steering device as defined in claim 24, wherein said first, second and third locating device components each comprise at least one ultrasonic transmitter-receiver arrangement.

28. The automatic steering device as defined in claim 24, wherein said first, second and third locating device components each comprise a laser distance measuring device.

29. The automatic steering device as defined in claim 24, wherein said locating device components each comprise a mechanical row detector.

30. The automatic steering device as defined in claim 24, wherein said three locating device components (OV1, OV2, OV3) include means for detecting said edge (GK) of said agricultural material at a predetermined forward distance (VA) therefrom so that locating signal variations partially include deviations of an agricultural material edge displacement (GKS) from a predetermined set value and partially include a steering device orientation angle relative to said edge (GK) of said agricultural material.

31. The automatic steering device as defined in claim 30, further comprising means for obtaining said deviations of the edge displacement and an angular orientation signal (RWS) characteristic of said orientation angle from said locating signal variations and means for addressing said deviations of said edge displacement and said angular orientation signal (RWS) to a two-dimensional characteristic data field of steering control parameters (LSG) to obtain the steering control parameter (LSG).

32. An automatic steering device for an electrically controllable hydraulic steering system of a steered vehicle having steered wheels (HR), said hydraulic steering system including means for controlling said steered wheels (HR) according to at least one electronic steering control signal (SHL,SHR), said automatic steering device comprising at least one locating device (OV) including means for generating at least one locating signal (OS) and a regulating device (ST) including means for receiving said at least one locating signal (OS), means for periodically digitizing the at least one locating signal (OS) to form an at least one digitized locating signal and means for producing said at least one electronic steering control signal (SHL,SHR) by a logic combination of said at least one digitized locating signal and a predetermined locating criterion to minimize a deviation of said at least one locating signal (OS) determined according to said predetermined locating criterion so that said at least one electronic steering control signal (SHL,SHR) depends approximately linearly on said deviation of said at least one locating signal (OS) in the vicinity of a null deviation so as to increase approximately linearly with said deviation as said deviation increases but said at least one electronic steering control signal increases progressively faster than approximately linearly beyond said vicinity of said null deviation.

* * * * *